United States Patent [19]

Schaire

[11] 4,453,229
[45] Jun. 5, 1984

[54] BUS INTERFACE UNIT

[75] Inventor: Scott H. Schaire, Huntington Manor, N.Y.

[73] Assignee: Grumman Aerospace Corporation, Bethpage, N.Y.

[21] Appl. No.: 356,949

[22] Filed: Mar. 11, 1982

[51] Int. Cl.³ .............................................. G06F 3/00
[52] U.S. Cl. .................................................. 364/900
[58] Field of Search ... 364/200 MS File, 900 MS File

[56] References Cited

U.S. PATENT DOCUMENTS

4,136,400 1/1979 Caswell et al. .................... 364/900

Primary Examiner—Raulfe B. Zache
Attorney, Agent, or Firm—John P. Kozma; Richard G. Geib; Daniel J. Tick

[57] ABSTRACT

A bus interface unit for use with a multiplexed biphase serial bus includes a Mealy modeled sequence logic unit which allows flexibility in the design and implementation of a desired data transfer algorithm. The unit's internal architecture is such that the device may be implemented on a single semiconductor chip.

33 Claims, 5 Drawing Figures

Fig.1 UPPER TWO THIRDS

Fig.1 LOWER
ONE THIRD

BUS INTERFACE UNIT

BACKGROUND OF THE INVENTION

Present very large scale integrated (VLSI) circuit technology allows the realization of single chip semiconductor devices having equivalent circuit elements an order of magnitude greater in number than on available devices of only a few years ago. Equivalent gates and circuits of VLSI devices, such as Motorola's M68000 microprocessor having 68,000 circuit elements, are approaching numbers near 100,000 with ranges of up to 500,000 anticipated by the mid-1980's. This trend of increasing chip complexity has been paralleled by a growing demand for the application of microprocessors in multiplexed data bus systems.

An example of such an application is the Integrated Avionics Control System (IACS) terminal developed by the assignee of the present invention. Designed to interface with a control network data bus, the IACS terminal may be used to carry out monitoring and control functions for any of a wide variety of control subsystems in ground vehicles, automatic test equipment, space systems, water vehicles, avionics systems, central controllers, etc. The military standard (MIL-STD) 1553 biphase serial bus, for which the IACS terminal was developed, provides for standardized inter-subsystem communication in such control systems by defining a flexible set of message formats and communication protocols. Accordingly, the IACS terminal satisfies the MIL-STD-1553 protocols by providing a custom LSI buffer interface between a G3008 general purpose microprocessor and a Harris HD-15531 Manchester Encoder/Decoder linked to the serial bus by a CT 1231 Transceiver, manufactured by Circuit Technology.

U.S. Pat. No. 4,222,116, issued to Groves, provides another example of a device designed for Manchester-encoded data multiplexing. The Groves device adds to the prior art the capability of handling varied data rates in Manchester encoded data streams.

A shortcoming of the above and other presently available devices, however, is that a dedicated processing device is required to generate the complex timing patterns involved in monitoring and controlling data transfers on the serial bus. As a result, existing network serial bus systems are limited as to the applicable processing devices employed in each subsystem terminal. Flexibility in control subsystem design is limited, therefore, by the capabilities of processors which can be adapted to present multiplex terminals.

A major object of this invention, then, is the provision of a bus interface unit capable of handling the protocols of a wide variety of flexible bus communication message formats and data transfer algorithms. Such message formats and data transfer algorithms may, for example, be designed to implement MIL-STD-1553 protocols.

Another object of the present invention is the design of a bus interface unit which frees an associated processing device from monitoring and controlling data transfer over an associated network serial bus. In keeping with this object, a goal of the present design is the implementation of a direct memory access with an associated microprocessor memory in which data transfer sequences between the network serial bus and microprocessor memory are conducted in a transparent fashion with respect to the microprocessor.

Yet another object of the present invention is the provision of a bus interface unit capable of being operated in either a bus controller or a remote terminal mode. As a bus controller, the bus interface unit initiates intersubsystem messages, while as a remote terminal, it responds in a predetermined manner to commands from another similar unit acting as a bus controller.

A still further object of this invention is to supply a bus interface unit which is compatible with a wide variety of existing microprocessors and transmitter/receivers.

It is yet a further objective of the present invention to provide such a unit which minimizes software interface requirements and processor interaction with the network bus. Realization of this objective maximizes bus utilization capability as well as freeing the processor to collect subsystem information concurrently with bus communications.

One still further object of this invention is to provide a bus interface unit with extensive means for error checking in serial bus communication to allow fail-safe control system operation.

It is another general object of this invention to provide a bus interface unit having a regular and structured architecture which may be implemented on a single chip using presently available technology.

SUMMARY OF THE PRESENT INVENTION

All of the above as well as other objects and advantages are realized, in brief, by the construction of a single-chip bus interface unit having a fixed internal register and logic structure. A Manchester encoder/decoder interfaces two logic-level coded serial shift registers, one for shifting words out to the serial bus, the other receiving incoming words from the bus. Each shift register in turn has an associated buffer register connecting it to an internal parallel bus. The internal bus communicates with a parallel direct memory access data port through a bidirectional buffer. Various other registers and associated logic elements store and interpret information from the internal bus to provide signals indicating what actions must be taken by the bus interface unit.

Execution of each data transfer action will involve the loading of various internal registers to be coordinated with communications through the serial and parallel data ports. A general communications algorithm incorporating various desired functional sequences may be implemented in the present invention by appropriate connection of sequence logic inputs and outputs in a fixed format sequence logic unit. Asynchronous inputs to the sequence logic are buffered by system clocked flip-flops, thus eliminating timing problems with respect to peripheral devices. Furthermore, because of the regular structure of the sequence logic unit, extremely sophisticated communication algorithms serving numerous protocols are realizable in a manageable portion of available chip area. The sequence logic model—a Mealy-type finite state machine—simplifies the implementation of the desired chip algorithm.

Other advantages of the present design will become apparent to those skilled in the art upon reading the following description of a preferred embodiment.

BRIEF DESCRIPTION OF DRAWINGS

Various references in the following description are made to the appended drawings, in which.

DETAILED DESCRIPTION OF PREFERRED EMBODIMENT

Figure 1:
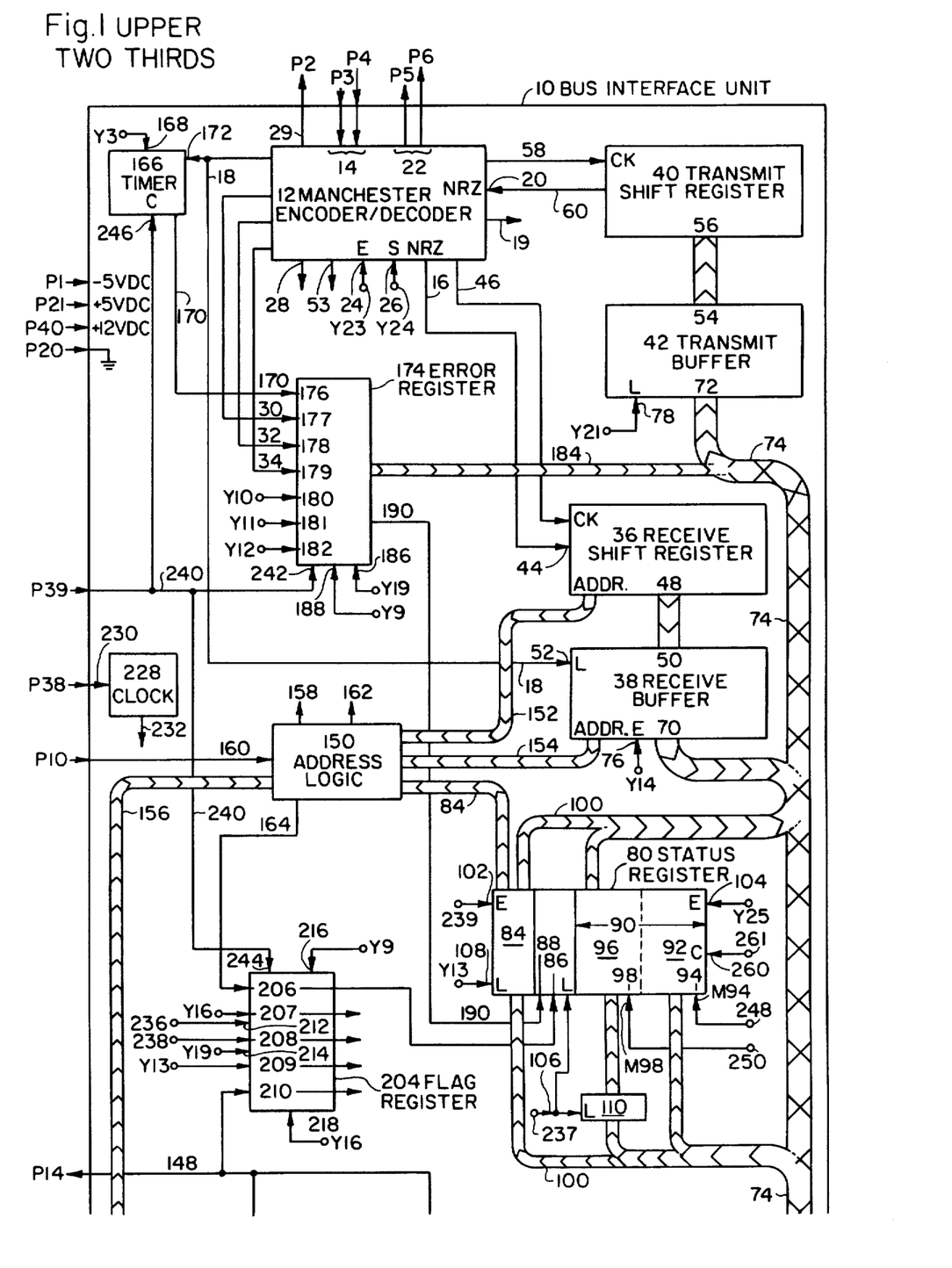
FIG. 1 is a partial block diagram of the present invention.

FIG. 1 shows a partial block diagram of the present invention. While discrete components may be used to assemble the bus interface unit as illustrated, the present design is realizable as a 40 pin, dual-in-line chip, using available MOS-LSI circuit technology. Accordingly, the external connections to the device 10 are identified by pin numbers P1 through P40. As will be appreciated by those of skill in the art, pins P1, P20, P21 and P40 represent supply voltage inputs −5 VDC, 0 VDC (ground), +5 VDC and +12 VDC. The remaining pin connections are discussed in relation to their associated circuit elements.

Block 12 of bus interface unit 10 represents a Manchester encoder/decoder and error detection logic. Encoder/decoder 12 includes a biphase serial input port 14, responsive to pins P3 and P4, for receiving an incoming serial data stream in biphase Manchester or transition code format. The format of the incoming data stream is changed by the decoding portion of block 12 to TTL compatible logic level or NRZ serial format which is output at 16. A word reception signal 18 indicates when the incoming data stream is active; that is, when the decoding means is operating. Thus when a sync pulse is detected in the incoming data stream, marking the beginning, of a defined segment or work, the word reception signal 18 will go high and stay high until the last bit of the incoming word is received. Block 12 also outputs a word identification signal 19 identifying the sync polarity of each incoming work, e.g., command sync or data sync.

As shown, block 12 also includes an NRZ input 20 through which an outgoing serial data stream is input in logic level format. After changing the format of the outgoing data stream to transition code, the encoding portion of block 12 outputs the outgoing data at biphase serial output port 22, connected to pins P5 and P6 of device 10. Enable input 24 controls the outgoing data stream; pulses to input 24 initiate the transmission of each word in the outgoing data stream. Sync select input 26 controls the sync polarity of each word in the outgoing data stream. Block 12 also outputs a word transmission signal 28 and a transmit mode signal 29 which is output at pin P2. Both signals 28 and 29 indicate when the outgoing data stream is active. However, word transmission signal 28 remains high only during the shifting in of data through NRZ input 20, while the transmit mode signal 29 remains high during the entire transmission of sync pulse and parity bit through output port 22.

Error detection logic in encoder/decoder 12 performs error checking in connection with the incoming data stream to provide information on the incoming words as they are received. Thus, bit count error signal 30 indicates whether the incoming word includes a proper number of bits, Manchester error signal 32 indicates the detection of any Manchester or phase transition errors in the incoming words, and parity error signal 34 indicates whether each incoming word has a proper parity.

To assist encoder/decoder 12 in the handling of serial data are provided a receive shift register 36, a receive buffer 38, a transmit shift register 40 and a transmit buffer 42. These registers are arranged to store one word at a time in logic level format. Receive shift register 36 includes a serial receive input 44 connected to the NRZ output 16, whereby words may be shifted in serially as by clock 46 to be output in parallel at 48. In turn, receive output 48 is connected to receive buffer input 50. Data flow through input 50 is controlled by load receive buffer input 52 responsive to word reception signal 18. Each word will be thus held in receive buffer 38 concurrent with the shifting of the next word in the incoming data stream into receive shift register 36. A contiguous word signal 53 output by encoder/decoder 12 indicates the presence of a new word in register 36.

Each word forming a segment of the outgoing data stream is routed first to transmit buffer 42, and through transmit buffer output 54 to the transmit input 56 of transmit shift register 40, then clocked out, as by clock signal 58, through serial transmit output 60. The serial output 60 is, in turn, connected to the NRZ input 20 of encoder/decoder 12. In essence, then, Manchester encoder/decoder 12 provides an interface for logic level coded registers 36 and 40 with a biphase transition code serial bus.

Pins P22 through P37 of the bus interface unit 12 define a parallel data port 62 compatible with TTL and similar logic level memory devices. Connected to parallel data port 62 is a bidirectional buffer 64 allowing data to be transferred selectively in either direction through port 62. A direction input 66 to buffer 64 controls the direction of data flow therethrough and thus whether port 62 will input or output data. An enable buffer input 68 controls the flow of data through buffer 64.

Connecting bidirectional buffer 64 with receive buffer output 70 and transmit buffer input 72 is an internal parallel bus 74. As shown, receive buffer 38 includes an enable receive buffer input 76 for controlling data flow through output 70 and transmit buffer 42 has a load transmit buffer input 78 for controlling data flow through input 72. Thus, buffers 38 and 42 provide an interface for parallel bus 74 with shift registers 36 and 40 for communication with the biphase serial bus. Two working registers, a status word register 80 and a command word register 82, are responsive to the parallel bus 74. Associated with register 80 are various inputs for updating the operating status of bus interface unit 12, while register 82 has associated therewith various logic elements for interpretting command words stored therein.

The status register 80 includes a status address field 84, a broadcast command bit 86, an error indicator bit 88, and a status error field 90. The status error field is further subdivided into an unbuffered field 92 including a dynamic bus control bit 94 and a buffered field 96 having a terminal flag bit 98. The status address field 84 is responsive to a corresponding address field 100 of bus 74, and a status address enable input 102 controls data flow from the status address field 84 back to the address field 100. Thus, a remote terminal address previously loaded into status address field 84 from bus 74 may be made available on the address field of bus 74 at any time by pulsing input 102. The remainder of the status word register—the broadcase command and error indicator bits 86 and 88 and the status error field 90—make up a status word field which is made available on the remainder of bus 74, similarly to the status address field 84, by means of a status enable input 104.

Loading of the status register 80 is controlled by a status load input 106 and an address load input 108. As shown, the unbuffered field 92 is loaded directly from bus 74, while the buffered field 96 is responsive to a status buffer register 110 which is in turn responsive to bus 74. The signals to which the broadcast command and error indicator bits 86 and 88 are responsive are isolated from bus 74 and described in detail below; however, the loading of bits 86 and 88 is simultaneous with the remainder of register 80. Accordingly, status load input 106 controls data flow into bits 86 and 88 and from status buffer register 110 into buffered field 96, while address load input 108 controls data flow from bus 74 into the status address field 84, unbuffered field 92 and status buffer register 110. It will thus be appreciated that complete updating of the status word register 80 requires successive pulsing of load inputs 106 and 108.

In contrast with status register 80, the command word register 82 is loaded exclusively from parallel bus 74, as shown by command word input 112 responsive to bus 74, and data flow through input 112 is controlled by a single load command word input 114. The contents of command word register 82 are made available on bus 74, as shown by command word output 116 connected to bus 74, by an enable command word input 118. Directly responsive to command register 82 is a last command word register 120 having a load last command input 122 for controlling data flow thereto from register 82. It will be appreciated that, since the enable command word input 118 controls data flow only through output 116, a command word stored in register 82 may be moved to register 120 by simply pulsing the load last command word input 122, without enabling the command register. Furthermore, as shown, since load inputs 114 and 122 are connected, loading command register 82 from bus 74 will automatically cause the previously stored command word to be retained in last command register 120. In turn, the previously stored command word may then be made available on bus 74 by means of a last command output 124 connected to bus 74, data flow through which is controlled by enable last command input 126.

In addition to last command word register 120 are associated with command word register 82 a mode code logic unit 128 and a mode code detector 130. Like register 120, these elements are directly responsive to register 82, regardless of what appears at enable input 118. In accordance with a desired, predetermined data structure, the command word register 82 is subdivided into a mode code field 132, a subaddress field 134, and a transmit receive bit 136. The remainder of the command word register 82 parallels the status address field 84 in register 80. Mode code logic unit 128 is responsive to the mode code field 132 and the transmit/receive bit 136 and includes hardwired logic to recognize mode codes in the command word which require specific action by bus interface unit 10. The presence of each such mode code is indicated by an output of unit 128. Thus, mode code logic unit 128 outputs a transmit last command mode signal 138, a dynamic bus control mode signal 140, a terminal flag inhibit mode signal 142, an override inhibit mode signal 144 and a transmit status mode signal 146. Mode code detector 130 is responsive to subaddress field 134 and includes hardwired logic to recognize a mode code bit pattern indicating the presence of a mode code in mode code field 132. A mode code detect signal 148 output by detector 130 indicates the detection of a mode code bit pattern in field 134.

An address compare logic unit 150 is responsive to the status address field 84 and corresponding address fields 152, 154 and 156 in the receive shift register 36, the receive buffer 38 and the command word register 82. As with mode code logic unit 128 and mode code detector 130, unit 150 is directly responsive to its associated address field inputs 84, 152, 154 and 156, without regard to enable inputs 76, 102 and 118. Appropriate logic in unit 150 is used to derive a status address compare signal indicating whether the address field 154 of the receive buffer matches the status address field 84, a command address compare signal indicating whether the address field 152 of the receive shift register matches the address field 156 of the command register, a receive broadcast signal indicating whether the address field 154 of the receive buffer matches a predetermined broadcast bit pattern, and a command broadcast detect signal indicating whether the address field 156 of the command word register matches the same broadcast bit pattern. The command broadcast detect signal is output at 158.

Further logic in the address compare logic unit 150 is responsive to the command and status address compare and receive and command broadcast detect signals as well as an operating mode signal 160, which is input to the bus interface unit 10 at pin P10. The operating mode signal 160 dictates which of two operating modes—remote terminal or bus controller—that unit 10 will operate in. Accordingly, the further combinatory logic of unit 150 outputs an address compare signal 162 indicating whether address field 154 of receive buffer 38 matches either the broadcast bit pattern or the status address field 84 when the bus interface unit 10 is operating in the remote terminal mode, and whether the address fields 152 and 156 of the receive shift and command registers 36 and 82 match when unit 10 operates in the bus controller mode. Another output, broadcast detect signal 164, indicates whether the address field 154 in receive buffer 38 matches the broadcast bit pattern when the bus interface unit 10 operates in the remote terminal mode, and whether the address field 156 in the command register 82 matches the broadcast bit pattern when unit 10 is operating in the bus controller mode.

A counter response timer 166 is arranged to measure the response time of other terminals to commands transmitted by the encoding portion of block 12. Resetting and starting of the counter is controlled by start count input 168, and the timer 166 outputs a response time error signal 170 indicating whether a predetermined maximum response time elapses before a response is received at input port 14. A stop count input 172 stops timer 166, disabling signal 170, and is responsive to the word reception signal 18.

A seven bit error register 174, with error bits 176-182, stores specific error information regarding sequences of words in the incoming data stream decoded by block 12. Accordingly, error bit 176 is responsive to the response time error signal 170, bit 177 to the bit count error signal 30, bit 178 to Manchester error signal 32, and bit 179 to parity error signal 34. The remaining error bits 180-182 are responsive to signal to be discussed later in this specification. As shown, the output from register 174 is connected to an error field 184 of bus 74, and data flow from the error bits 176-182 to bus 74 is controlled by error enable input 186. Register 174 also has a clear error input 188 for clearing the error bits, and outputs an error indicator signal 190 indicating whether any of the error bits are set.

A three bit control register 191 includes control bits 192, 193 and 194, each responsive to a designated bit of bus 74. Data flow from bus 74 to register 191 is controlled by a load control code input 195.

A word counter 196 is responsive to the mode code field 132 of command register 82 and the mode code detect signal 148. The absence of a mode code in field 132 as indicated by signal 148 signifies that a word count is contained in the mode code field 132 of register 82, and this word count is loaded into word counter 196 by means of a load word count input 198. The word count signifies a number of data words to be transmitted or received in the incoming or outgoing data streams following the command word, and is decremented as each such data word is transmitted or received by means of a decrement input 200. A word count zero signal 202 output by counter 196 indicates when the word count is equal to zero.

A five bit flag register 204 having flag bits 206-210 performs a function similar to condition code registers incorporated in existing microprocessors, storing information on various data conditions and chip operations. Flag bit 206 is responsive to the broadcast detect signal 164 from address compare logic 150, and broadcast command bit 86 in the status register 80 is in turn responsive to flag bit 206. Flag bit 210 is responsive to the mode code detect signal 148. The inputs to the remaining flag bits 207-209 will be discussed in greater detail below.

In addition to the individual flag bit inputs, register 204 includes various load and clear inputs for controlling the setting and resetting of the various flag bits according to a desired scheme. Thus, a clear command flag input 212 and a clear toggle flag input 214 are provided for individually clearing the second and third flag bits 207 and 208 respectively, while all of the flag bits except bit 209 may be cleared by means of a flag clear input 216. The setting of flag bits 206 and 210 is controlled by a load flag input 218.

Figure 2:
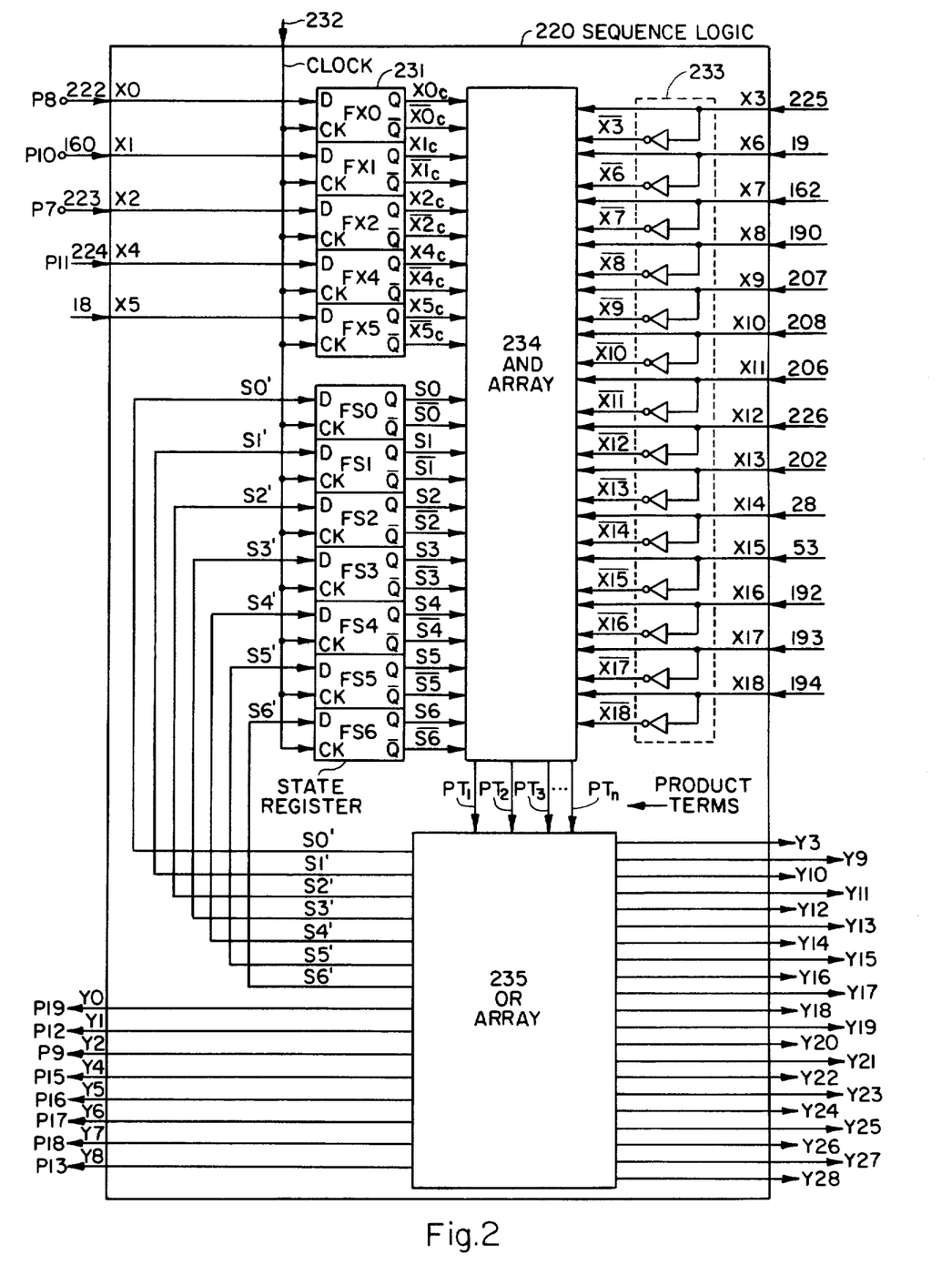
FIGS. 2, 3 and 4 are drawings of elements not shown in FIG. 1.

With reference to FIG. 2, the control signals required for loading, enabling and clearing the various registers, setting error bits 180-182 and flag bits 207-209, and informing peripheral equipment of the current operating condition of the bus interface unit 10 are supplied by a sequence logic unit 220. Because these control signals in effect regulate the entire data transfer process between the serial bus and the direct memory access port 62, sequence logic 220 must receive a set of logical signals which, when continuously monitored, completely characterize the operational status of bus interface unit 10. That is, by appropriately considering the past history and present condition of such a set of logical signals, one may determine when each register should be loaded or enabled, when the various error and flag bits should be set or cleared, etc. In a preferred embodiment, nineteen signals are received by sequence logic 220 at logic inputs X0 through X18.

As shown, four of the sequence logic 220 inputs are responsive to externally generated signals: X0 to a command strobe signal 222 from pin P8, X1 to the operating mode signal 160, X2 to a bus grant acknowledge signal 223 from pin P7, and X4 to a data transfer acknowledge signal 224 from pin P11. Operating mode signal 160 from pin P10 has been described in connection with address compare logic 150, while signals 222, 223 and 224 provide information concerning the parallel data port 62. Specifically, command strobe signal 222 indicates a host subsystem generated direct memory access request, bus grant acknowledge signal 223 indicates availability of port 62 for transfer of a data word, and data transfer acknowledge signal 224 indicates completion of the transfer of a data word into buffer 64 through port 62, (i.e., from an internal register to memory or vice-versa).

The remaining sequence logic inputs X3 and X5 through X18 are responsive to internally generated signals and bit outputs. As shown, X3 is responsive to a logical combination 225 of the transmit last command mode and mode code detect signals 138 and 148; X5 to word reception signal 18; X6 to word identification signal 19; X7 to address compare signal 162; X8 to error indicator signal 190; X9 to flag bit 207; X10 to flag bit 208; X11 to flag bit 206; X12 to a logical combination 226 of a designated bit 132a in the mode code field 132 and the transmit/receive bit 136 of command word register 82 and the mode code detect, dynamic bus control mode, transmit status mode, operating mode and command broadcast detect signals 148, 140, 146, 160 and 158; X13 to word count zero signal 202; X14 to word transmission signal 28; X15 to contiguous word signal 53; and X16-X18 to the three control register bits 192, 193 and 194.

It will be appreciated that synchronization of the loading and enabling of bus interface unit 10 registers and data storage elements is accomplished by means of a clock generator 228 (FIG. 1) responsive, in turn, to a high speed input clock signal 230 from pin P38. Because sequence logic inputs X0, X1, X2 and X4 are responsive to external signals and may thus change state while the various registers are enabled or being loaded, synchronization of these inputs is required. Input X5 may also exhibit asynchronous behavior with respect to internal registers since the activity in the incoming data stream indicated by data reception signal 18 will not necessarily be coordinated with clock 228. Accordingly, sequence logic 220 is provided with an asynchronous input buffer 231 having five D-type flip-flops FX0, FX1, FX2, FX4 and FX5 clocked by an appropriate signal 232 from clock generator 228 and responsive to unsynchronized inputs X0, X1, X2, X4 and X5 respectively. The true and complemented synchronized inputs from flip flops FX0, etc. are indicated by $X0_c$, $\overline{X0}_c$, etc.

Complements for the remaining sequence logic inputs X3, X6, etc. are derived by inverter array 233. A logical AND array 234 is responsive to the buffered inputs and their complements, $X0_c$, $\overline{X0}_c$, etc. and the unbuffered inputs and their complements, X3, $\overline{X3}$, etc. In turn, AND array 234 outputs a plurality of product terms $PT_1, PT_2, \ldots PT_n$. A logical OR array 235, responsive to the product terms from AND array 234, outputs a plurality of sum terms.

One set of sum terms from OR array 235, identified in FIG. 2 as S0', S1', ... S6', are fed back into a state register preferably comprising seven D-type flip flops FS0, FS1, ... FS6 clocked by sequence logic clock signal 232. The outputs, S0, S1, etc. from flip flops FS0, etc., represent state variable signals and are input to AND array 234 with their complements as are logical inputs $X0_c, X1_c, \ldots X3, \ldots$ etc.

The remaining sum terms from OR array 235, shown as Y0, Y1, ... Y28, make up the sequence logic outputs used for loading and enabling the various registers, etc.

With regard to those sequence logic outputs informing peripheral devices of the operating condition of bus interface unit 10 (i.e., those connected to chip pins) in a preferred embodiment of the present invention, Y0 defined an invalid message signal, indicating the detection of errors in the incoming data stream, and is output at pin P19; Y1 defines a write enable signal indicating a stable condition in bidirectional buffer 64, and is output at pin P12; Y2 defines a command strobe acknowledge signal indicating availability of bus interface unit 10 in response to command strobe signal 222, and is output at pin P9; Y4 defines a data transfer request signal indicating the need for data transfer through parallel data port 62, and is output at pin P15; Y5 defines a read/write signal indicating the direction of data flow between bus 74 and data port 62, and is output at pin P16; Y6 defines a command/data signal indicating a type of data flowing through buffer 64 (i.e., command word or data word) when Y5 indicates a write mode (i.e., data flow from bus 74 to port 62), and otherwise (i.e., when Y5 indicates a read mode) indicating the completion of a data read through port 62 to bus 74, and command/data signal Y6 is output at pin P17; Y7 defines a message complete signal indicating when the outgoing data stream becomes inactive, and is output at pin P18; and Y8 defines a valid command signal indicating the reception of a valid command in the incoming data stream, and is output at pin P13.

The clear command flag input 212 of flag register 204 is responsive to a logical combination 236 of invalid message signal Y0 and message complete signal Y7, and the direction input 66 of buffer 64 is responsive to read/write signal Y5. Other loading, enabling, clearing, and error indicator signals are taken from the remaining sequence logic 220 outputs Y3 and Y9 through Y28.

Accordingly, in a preferred embodiment, the start count input 168 of response timer 166 is responsive to a load timer signal defined by Y3; the clear error and flag clear inputs 188 and 216 are responsive to a clear error/flag signal defined by Y9; the fifth, sixth and seventh error bits 180, 181 and 182 are responsive to, respectively, an improper sync signal, an address mismatch signal and an improper word count signal defined, respectively, by Y10, Y11, and Y12; the address load input 108 of status register 80 and flag bit 209 of flag register 204 are responsive to a load terminal address signal defined by Y13; enable receive buffer input 76 is responsive to an enable data signal defined by Y14; the load command word and load last command inputs 114 and 122 are responsive to a load command signal defined by Y15; the load word count and load flag inputs 198 and 218 and flag bit 207 are responsive to a load word counter signal defined by Y16; the enable command word input 118 is responsive to an enable command signal defined by Y17; the enable buffer input 68 of the bidirectional buffer 64 is responsive to an enable buffer signal defined by Y18; the clear toggle flag input 214 of flag register 204 and the error enable input 186 are responsive to a strobe mode code signal defined by Y19; the load transmit buffer input 78 is responsive to a load transmit buffer signal defined by Y21; the decrement input 200 of word counter 196 is responsive to a shift word count signal defined by Y22 the transmit enable and sync select inputs 24 and 26 of encoder/decoder 12 are responsive to, respectively, transmit enable and sync select signals defined, respectively, by Y23 and Y24; status enable input 104 is responsive to an enable status word signal defined by Y25; enable last command input 126 is responsive to an enable last command signal defined by Y26; and the load control code input 195 is responsive to a load control word signal defined by Y27.

Sum term Y20 defines a status word load signal which is logically combined with the transmit/receive bit 136 from register 82, the mode code detect signal 148, and the transmit status and transmit last command mode signals 146 and 138 from mode code logic unit 128 to provide a load signal 237 for status load input 106 of register 80. Sum term Y28 defines a set toggle signal which is logically combined with the operating mode signal 160 and the load word counter signal Y16 to provide a set signal 238 which sets flag bit 208 in flag register 204. Status address enable input 102 of register 80 is responsive to a logical combination 239 of the enable status word and strobe mode code signals Y25 and Y19.

A power-on reset signal 240 (FIG. 1) is input to bus interface unit 10 at pin P39 and is used to initialize or clear the error register 174, the flag register 204 and the response timer 166, as shown by reset inputs 242, 244 and 246 to those elements.

The dynamic bus control and terminal flag bits 94 and 98 of status word register 80 include mask inputs M94 and M98 which allow their outputs to be masked without affecting the data stored in each. Thus, when input M94 is active, the output from bit 94 will be active regardless of the state of bit 94. Masking of the terminal flag bit 98 operates in reverse; that is, activity on input M98 causes the output of bit 98 to be inactive.

Mask inputs M94 and M98 are responsive to flip-flops 248 (FIG. 3) and 250 (FIG. 4) respectively. As shown, flip-flop 248 has a set dynamic bus mask input 252 responsive to a logical combination 253 of flag bit 210, transmit/receive bit 136 and strobe mode code signal Y19, and a clear dynamic bus mask input 254 responsive to a logical combination 255 of transmit/receive bit 136, mode code detect signal 148, and the dynamic bus control mode signal 140. Flip-flop 250 has a set terminal flag mask input 256 responsive to a logical combination 257 of the terminal flag inhibit mode and strobe mode code signals 142 and Y19, and a clear terminal flag mask input 258 responsive to a logical combination 259 of the override inhibit mode and strobe mode code signals 144 and Y19 and flag bit 210.

All of the bits in the status error field 90 except dynamic bus control bit 94 are cleared by means of a status clear input 260 to status register 80. Status clear input 260 is responsive to a logical combination 261 of the transmit/receive bit 136, flag bit 207, mode code detect signal 148, message complete signal Y7, and the transmit last command and transmit status mode signals 138 and 146.

The present invention may be employed to advantage in connection with a control system network in which a number of subsystems communicate over a common biphase serial bus. Such control networks might be found in aircraft, sophisticated ground vehicles, test equipment and the like. Each control subsystem in the network would be equipped with a bus interface unit 10 for monitoring the serial bus. Messages on the serial bus addressed to a particular subsystem, then, would be channeled from the serial input port 14 to the parallel data port 62 of the subsystem's bus interface unit. Similarly, messages from a particular subsystem to be transmitted to the serial bus would be routed from port 62 to serial output 22 of the associated bus interface unit 10.

It is anticipated that each subsystem may be further equipped with a programmable data processing device such as an eight or 16-bit microprocessor for carrying out the necessary data manipulation and control functions associated with that subsystem. Accordingly, the present invention is adaptable to a wide variety of data processing devices, allowing a desirable flexibility in the design of each subsystem. Preferably, data port 62 is directly connected to a memory device associated with the subsystem processor, and asynchronous, direct memory access "handshaking" signals are supplied by a sequencing device, such as an 82S105 field programmable logic sequencer manufactured by Signetics. The requirements of a particular subsystem processor, then, are matched to the bus interface unit 10 by appropriate programming of the sequencing device.

Those skilled in the art will appreciate that asynchronous operation of the memory access signals eliminates as a major consideration the access time of the processor memory device connected to data port 62. Furthermore, appropriate interpretation of the read/write and command/data signals Y5 and Y6 by the associated sequencing device enables bus interface unit 10 to initiate any of four different memory access operations. To begin transfer through port 62, the bus interface unit asserts the data transfer request signal Y4, and waits for a bus great acknowledge on signal 224. For memory access operations involving data transfer into the bus interface unit 10 through port 62, the write enable signal Y1 is then asserted, after which data transfer acknowledge signal 226 indicates completion of the data transfer.

In order that each control subsystem may both receive and transmit messages over the control network serial bus, bus interface unit 10 may be operated in either of two modes as dictated by operating mode signal 160 input at pin P10. In the remote terminal mode, then, unit 10 responds to commands from the serial bus, as monitored through input port 14, while as a bus controller, the bus interface unit transmits messages from its associated subsystem to other subsystems in the control network as dictated by commands from the subsystem processor. Since the operating mode depends on an input to the bus interface chip, each subsystem may, under the control of the subsystem processor, be appropriately programmed to change modes at any time to facilitate the execution of its intended functions.

Each message to be conducted by the network serial bus should have certain characteristics recognizable by each subsystem to ensure effective intersubsystem communication. One such characteristic, of course, is an identification of the particular subsystem which is the message's intended destination. Another important parameter is the length of (i.e., the number of words in) the message. Also desirable is a provision for recognition of errors in each message which can be analyzed to pinpoint failures in the network bus or subsystems.

The present invention makes possible the implementation of a message format allowing intersubsystem communication which is effectively transparent to the subsystem processors. That is, bus interface unit 10, rather than the associated processor, monitors and controls the reception or transmission of each word in a message, determines whether incoming messages are addressed to its host subsystem, checks for errors in incoming messages, and maintains information on the status of the subsystem for outgoing messages. The subsystem processor is thereby free to interact with other subsystem elements concurrently with network serial bus communication transfers.

In a preferred message format, then, each message on the network serial bus consists of one or more words, each such word including a leading sync pulse and a trailing parity bit. Between the sync pulse and parity bit of each serial bus word is the bit information which is shifted by encoder/decoder 12 into register 36 or out of register 40. As will be appreciated by those familiar with biphase serial communication systems, the sync and bit polarities of each word are represented by appropriately timed signal level transitions, with the network bus signal level transitioning through zero for each sync or bit pulse.

For each word in an incoming message encoder/decoder 12 determines the polarity of the sync pulse and counts the bit transitions. The sync polarity of each incoming word is used to derive word identification signal 19. If the incoming word includes extra bit transitions, an error is indicated on bit count error signal 30. If any bit transitions are missing or out of phase, Manchester error signal 32 is asserted. And, finally, when all of the bits have been received, the parity bit is checked and parity errors are noted on parity error signal 34. Word reception signal 19 marks the shifting of information into register 36 and causes the most recently shifted in word in register 36 to be loaded into buffer 38. Contiguous word signal 53 indicates the detection of a sync transition within a specified period following the parity transition of the word most recently shifted into register 36.

For outgoing messages, encoder/decoder 12 functions in converse fashion. Initiation of each word transmission is governed by transmit enable signal Y23, which causes encoder/decoder 12 to transmit a sync pulse through serial output port 22, the polarity of the sync pulse being dictated by sync select signal Y24. The word transmission signal 28 is then asserted as information is shifted out of register 40, after which unit 12 completes each serial bus word transmission by supplying an appropriate parity bit.

From the foregoing it will be inferred that each word in a message may be classified into one of two types according to its sync polarity. A further feature of a preferred message format is that only those words identified by a command sync need be examined to ascertain which subsystem a message is addressed to, how many words the message includes, and what, if any, information must be transmitted in response to the message. Each such item of information is encoded in a predetermined format and positioned in a predetermined field to form a command word. Thus, each command word is made up of a subaddress field, a transmit/receive bit, a mode code/word count field, and an address field. It will be understood that the address fields 84, 152, 154, 156 and 100 of the status, receive shift, receive buffer, and command registers 80, 36, 38 and 82 and parallel bus 74 are aligned with the predetermined position of the address field in command word format. Furthermore, it will be understood that the predetermined command word format positions of the transmit/receive bit, the subaddress field and the mode code/word count field similarly dictate the interconnections between command word register 82 and mode code logic unit 128, mode code detector 130 and word counter 196.

According to a preferred operation of the present invention, then, when bus interface unit 10 is operating in the remote terminal mode, the identity of its associated subsystem within the control network is established in the status address field 84 of register 80. When an incoming command word is indicated by word identification signal 19 and address compare logic 150 indicates that such incoming command is intended for the host subsystem, the command word is loaded into register 82. In turn, mode code detector 130, mode code logic 128 and word counter 196 provide signals which ensure appropriate routing of the message including the command word, or the transmission of an appropriate response to the command word.

Specifically, the transmit/receive bit 136 indicates whether the incoming message includes any further words to be received, or whether the command requires a response to be transmitted. If two or more data words follow the command word in an incoming message, the command word will include a word count in the mode code/word count field which is loaded into word counter 196 and decremented as each following data word is transferred to the subsystem memory through port 62. Otherwise, the incoming command may include a mode code command in the mode code/word count field. Designated bit 132a in the mode code field 132 indicates whether the mode code has an associated data word following the command word.

In order to ensure fail-safe intersubsystem communication, bus interface unit 10, when operating in the remote terminal mode, is preferably arranged to transmit the contents of status register 80 in response to incoming commands. Thus, the message initiating subsystem, whose associated unit 10 is operating in the bus controller mode, is capable of checking the response time and address of the receiving terminal to verify proper transmission. Also, the status word response may be written into the associated subsystem memory for further diagnostic interpretation by the message initiating subsystem processor.

Initial loading of the status register is performed by the subsystem processor through port 62, as described below, while various bits in register 80 are preferably updated as messages are received from the network bus. Interpretation of the status word, then, is in accordance with the masking and logic inputs to register 80.

Control over bus interface unit 10 by the associated subsystem processor is initiated by the assertion of command strobe signal 222, which may be done when the bus interface unit is in either operating mode. Prior to asserting the command strobe signal, the subsystem processor prepares the subsystem memory with an appropriate control word to be loaded into the three bit control register 191. This control word indicates to the bus interface unit whether a message is to be transmitted on the network bus or whether another action is to be taken. One three bit control code, then, is preferably used to load the status register, which is necessary to establish a remote terminal address. Other control codes may be used to transfer the contents of the various bus interface unit registers to the subsystem memory for diagnostic purposes.

With regard to flag register 204, those readers familiar with finite state machines will realize that its function could be performed by state sequencing logic 220. However, it is believed that the expansion of the sequence logic required to incorporate the flag register functions would greatly complicate the design without adding appreciably to its flexibility. Accordingly, flag register 204 serves as an adjunct to sequence logic 220, with each of the flag bits 206 through 210 informing the sequence logic or other elements of bus interface unit 10 of a specific condition pertinent to the general operation of the device.

Flag bit 206, then, is set when a predetermined broadcast bit pattern is detected by address compare logic 150 in the address field of an incoming command from the network bus. Such a command is to be executed by all bus interface units in the network, and therefore requires the suppression of any response transmissions otherwise called for. For a bus interface unit acting as a bus controller, then, input X11 from the broadcast command flag 206 allows the state sequence logic 220 to branch over any response reception sequences after transmitting a broadcast command, while as a remote terminal, flag 206 preferably signals logic 220 to suppress transmission of responses. As described earlier, the broadcast command bit 86 is also responsive to flag bit 206. Thus, sequence logic 220 may update the status word to reflect the reception of a broadcast command by asserting status word load signal Y20.

Flag bit 207 is set when a valid command is received in the remote terminal mode from the network bus. Preferably, the bus interface unit will ignore messages not signified by a leading command word. Accordingly, command flag 207 informs state sequence 220, at input X9, when a valid commad is received. The command flag is cleared by means of input 212 at the completion of each message or when an invalid message is recognized, as indicated by signals Y7 and Y0. The sequence logic also sets the command flag on recognition of a valid command, concurrently with the loading of word counter 196, by means of signal Y16.

The message monitoring function of flag bit 207 is sipplemented by flag bit 208, which is set by signal Y28 when a data word follows a valid command word in an incoming message. Thus, by means of input X10 from toggle flag 207, the state sequence logic 220 is able to recognize improper command syncs following the initial incoming message words. Toggle flag 207 may also be used to implement the transmission of messages from a bus interface unit operating in the remote terminal mode to another similarly operating unlit in the network. Preferably, such inter-remote terminal messages are initiated by a third bus interface unit acting as a bus controller. The bus controller transmits successive command words indicating the same word count, the first a receive command addressed to the receiving terminal, followed by a transmit command addressed to the transmitting remote terminal. Thus, when the receiving terminal receives a valid receive command addressed to it, followed by a contiguous transmit command addressed to the transmitting terminal, it waits for the response from the transmitting terminal before setting its toggle flag. The bus controller unit which initiates the remote terminal to remote terminal transfer preferably sets its toggle flag after the transmit command is transmitted, concurrent with the loading of its word counter, so its sequence logic will recognize responses from first the transmitting and then the receiving remote terminals.

Flag bit 209 is set when the associated subsystem processor loads status word register 80. Preferably, encoder/decoder 12 is responsive to remote terminal address flag 209, and will not shift in any messages while the bus interface unit is operating as a remote terminal until a remote terminal address identifying the associated subsystem is established in register 80.

Flag bit 210 is set when a mode code is detected in an incoming command word, and ensures proper loading of the word counter and recognition of mode codes.

Sequence logic 220, as shown in the preferred embodiment of FIG. 2, is modelled as a Mealy-type, finite state machine. A present functional state of logic 220 is defined by the bit pattern stored in flip-flops FS0 through FS6, allowing the implementation of up to 128 ($2^7$) different sequencing states. Each defined state, in turn, has one or more product lines connected by appropriate series gates to the state flip-flop outputs representing that state. For example, if a state 0000000 is defined, the associated product lines would be connected to $\overline{S6}, \overline{S5}, \overline{S4}, \overline{S3}, \overline{S2}, \overline{S1}$ and $\overline{S0}$; product lines for a defined state 0000001 would each be connected to $\overline{S6}$, $\overline{S5}, \overline{S4}, \overline{S3}, \overline{S2}, \overline{S1}$ and S0; etc.

Figure 5:
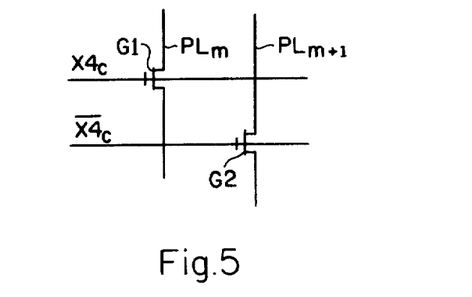
FIG. 5 is an exemplary detail from FIG. 2.

Each defined state, then, may be arranged to monitor any selected combination of sequence logic 220 inputs X0, X1, . . . , X18 by appropriate connections to the product lines associated with that particular state. Some states may have only one associated product line connected to the appropriate sequence variables but not to any of the other inputs. Other defined states may monitor only one input, in which case two product lines will be associated with that state. For example, one state may represent the condition where bus interface unit 10 is waiting for data to be transferred into buffer 64 through port 62. FIG. 5 shows portions of two product lines, $PL_m$ and $PL_{m+1}$, which might be associated with such a state. As shown, product line $PL_m$ includes a series gate connection G1 connected to $X4_c$, while line $PL_{m+1}$ is connected by G2 to $\overline{X4_c}$, thus allowing sequencer 220 to branch back to the same state until the data transfer acknowledged signal 224 connected to input X4 is asserted. Any number of combination of inputs may be monitored in a given state, provided, of course, that all possible combinations of inputs for that state will activate exactly one product line.

From the foregoing it will be appreciated that each product line output by AND array 234 to OR array 235 represents a present state and input condition for which a particular next state and output condition is desired. Accordingly, those outputs and next state variables to be asserted for each state and input condition are simply connected to the appropriate product line in OR array 235. Of course, the gate connections to the sum lines in the OR array will be in parallel in contrast with the series connections of AND array 234.

The Mealy model characterization of sequence logic 220 is implicit from the foregoing description. As will be appreciated by those skilled in the art, a Mealy machine is one in which both the outputs and the next state are dependent upon the present state and inputs. Another popular model of a finite state machine, in which the outputs depend only on the present state and not on the present inputs, is the Moore machine. Of course, sequence logic 220 could be modelled as a Moore machine by defining a state for each product line in the Mealy model, but the Mealy model is preferred since it involves a lesser number of states and provides greater design flexibility.

With regard to the feasibility of implementing sequence logic 220 on a single chip device, those skilled in the art will appreciate that the chip area which must be devoted to the AND and OR arrays 234 and 235 will be proportional to the total number of product lines used. It is anticipated that a sophisticated data transfer algorithm would require no more than 100 states, which, as stated above, may be represented by seven state variables. If, in turn, each state has an average of between two and three associated product lines, the total number of product lines will be between two and three hundred. In the physical integrated circuit, these lines may be arranged in parallel, with a spacing of approximately one mil per line using available technology. Orthogonal to the product lines are the ture and complemented inputs and state variables in AND array 234, 52 in number, and the sum terms defining the sequence logic outputs and next state variables in OR array 235, totaling 36. Using the same one mil spacing for the 88 total AND array input and OR array output lines, then, the total chip area consumption will be between 0.176 and 0.264 square inches, or on the order of one half the total available area of a typical 40-pin chip.

While the latter figure represents an upper limit on required chip area, it is nonetheless desirable to implement sequence logic 220 using as few product lines as possible. The number of product lines associated with each state is, of course, related to the number of inputs which must be monitored in that state. For some states it is possible to logically combine necessary inputs before they are introduced into the AND array. For example, in the aforedescribed embodiment, X3 is connected to a signal indicating the detection of a particular mode code command. Since, as described, the mode code field also serves as a word count field, signal 225 which is input at X3 preferably indicates the logical AND of transmit last command mode signal 138 and mode code detect signal 148. Similarly, input X12 is to be monitored in states devoted to other transmit sequences initiated by transmit/receive bit 136. Preferably, however, such transmit sequences will additionally depend on some other condition. That is, X12 will remain inactive in the remote terminal mode, even when bit 136 is active, unless a broadcast command, a non-mode code command, or any of a particular set of mode code commands is detected. Accordingly, signal 226 to which X12 is responsive represents the logical AND of transmit/receive bit 136 with the logical sum of an appropriate set of other signals.

Further chip area reduction follows the elimination of outputs. In the present invention fewer outputs than might otherwise be necessary are rendered sufficient through the use of various logical combinations. Signal 236, for example, clears command flag 207, terminating reception of a current message, when either an error in the message is indicated by invalid message signal Y0 or the end of the message is indicated by message complete signal Y7. Similarly, updating of the status word for transmission is controlled by status word load signal Y20 in conjunction with either of two conditions indicated by the logical AND of transmit/receive bit 136, mode code detect signal 148, and transmit status mode signal 146; or the transmit last command mode code detection indicated by signal 225. For remote terminal to remote terminal messages facilitated by toggle flag 208, the different treatment of set toggle signal Y28 required by the initiating bus controller is appropriately reflected in the logical combination of signal 238.

Figure 4:
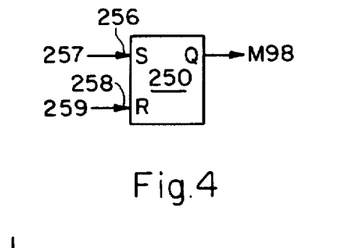

Like load word count signal Y16, the strobe mode code signal Y19 preferably serves several functions. In general, Y16 is associated with the execution of commands (e.g., loading word counter 196 and flag register 204 and setting toggle flag 208), while Y19 serves to update status register with appropriate mode code information. Specifically, strobe mode code signal Y19 sets terminal flag mask 250 in conjunction with detection of the appropriate mode code, and clears mask 250, provided the mode code flag 210 has been set, in conjunction with another appropriate mode code signal. As pointed out above, Y19 also clears toggle flag 208 and enables the error register 174 on bus 74. Preferably, error field 184 and address field 100 are non-overlapping, and the status address field 84 of status register 80 is enabled on bus 74 whenever either the status or error register is enabled. Thus enable signal 239 to status address enable input 102 is the logical OR of Y19 with Y25.

Figure 3:
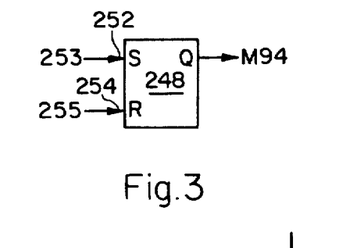

Preferably, dynamic bus mask 248 is independent of sequence logic 220, and is set, thus masking bit 94 inactive, by the detection of a mode code and appropriately set transmit/receive bit, as represented by mask set signal 253. The dynamic bus control bit is re-enabled by a specific dynamic bus control mode code, indicated by mode signal 140 and mode code detect signal 148, again in conjunction with bit 136.

Another preferred characteristic of bit 94 in status register 80 is that it is not cleared with the remainder of the status error field 90 by signal 261. Preferably signal 261 is derived from the message complete signal Y7 AND'ed with command flag 207, just as the status load signal 237 is derived from status word load signal Y20. Thus, all the status word bits in field 90 except dynamic bus control bit 94 are cleared after each validly completed message.

It will be appreciated that much of the logic described above is adapted in particular to the MIL-STD-1553 protocols which may be found in Government publications dealing with the Aircraft Internal Time Division Command/Response Multiplex Data Bus. While desirable, these protocols are not essential, and those skilled in the art will recognize that numerous features of the above described embodiment may be eliminated without departing from the spirit of the present invention. For instance, if 64 or fewer functional states are required, one sequence logic variable may be eliminated, resulting in the elimination of one sum line in OR array 235 and two input lines to AND array 234. Or, if mode codes are not to be used, inputs X3 and X12 can be replaced with a single transmit/receive input, and mode code logic 128 and detector 130 can be eliminated. Similarly, if four or fewer control codes are required, one of the bits of control register 191 may be eliminated. These and other variations in the bus interface unit architecture will be obvious to those skilled in the art.

Of course, within the described system architecture, once the active levels for all the inputs, outputs and internal signals are chosen and appropriate coding formats for control bits 192-194 and the necessary mode codes are determined, the bus interface unit of the present invention may be made to conform to any one of a variety of data transfer algorithms. It will be appreciated that implementation of a desired algorithm is readily accomplished in the present invention by defining functional states around the desired sequences, assigning bit patterns for each defined state, and making the appropriate connections for each assigned bit pattern in sequence logic 220. While many possible functional sequences are suggested by the names used for the mode codes and by various other descriptions above, these should be taken by way of example only, and not as limiting the scope of the present invention. Those skilled in the art, then, will realize that numerous functional sequences in addition to remote terminal to remote terminal transfers, writing various registers into memory for diagnostic purposes, etc., may be implemented within the general teaching of this invention.

For these reasons, the scope of the present invention is to be measured only by the claims which follow.

What is claimed is:

1. In a multiplex data bus interface unit having a Manchester encoder/decoder providing an interface for transmit and receive shift registers to a biphase serial bus, buffer registers providing an interface for the shift registers with an internal parallel bus communicating with a parallel direct memory access data port through a bidirectional buffer, and at least one additional register responsive to the internal bus, the inmprovement comprising:
means for defining a functional state of the bus interface unit;
means for monitoring a plurality of logical signals characterizing the operational status of the bus interface unit, the monitoring means generating a plurality of control signals regulating a data transfer process between the biphase serial bus and the parallel direct memory access data port.

2. The bus interface unit of claim 1 in which the means for defining a functional state generates a plurality of state variable signals.

3. The bus interface unit of claim 2 in which the monitoring means further monitors the state variable signals.

4. The bus interface unit of claim 3 in which the means for defining a functional state is responsive to a least one of the control signals, whereby the functional state of the bus interface unit may be changed.

5. The bus interface unit of claim 4 in which the buffer providing an interface for the receive shift register to the internal parallel bus has an enable receive buffer input for controlling data flow therefrom to the internal parallel bus, said enable receive buffer input being responsive to another one of the control signals.

6. The bus interface unit of claim 5 in which the buffer providing an interface for the transmit shift register to the internal parallel bus has a load transmit buffer input for controlling data flow thereto from the internal parallel bus, said enable receive buffer input being responsive to still another one of the control signals.

7. The bus interface unit of claim 6 in which the additional register has a load input for controlling data flow thereto from the internal parallel bus, said load input to the additional register being responsive to still another one of the control signals.

8. The bus interface unit of claim 7 in which the Manchester encoder/decoder has a transmit enable input for controlling data flow from the transmit shift register to the biphase serial bus, said transmit enable input being responsive to still another one of the control signals.

9. The bus interface unit of claim 8 in which the additional register has an enable input for controlling data flow therefrom to the internal parallel bus, said enable input to the additional register being responsive to still another one of the control signals.

10. The bus interface unit of claim 8 in which the bidirectional buffer has a direction input for controlling a direction of data flow between the internal parallel bus and the parallel direct memory access data port, said direction input being responsive to still another one of the control signals.

11. The bus interface unit of claim 10 in which bidirectional buffer further has an enable buffer input for controlling data flow therethrough, said enable buffer input being responsive to still another one of the control signals.

12. The bus interface unit of claim 11 in which the additional register has an enable input for controlling data flow therefrom to the internal parallel bus, said enable input to the additional register being responsive to still another one of the control signals.

13. A bus interface unit comprising:
   a receive shift register for receiving an incoming data stream from a biphase serial bus;
   a transmit shift register for transmitting an outgoing data stream to the biphase serial bus;
   a Manchester encoder/decoder for providing an interface for the transmit and receive shift registers to the biphase serial bus;
   an internal parallel bus;
   a receive buffer for providing an interface for the receive shift register to the internal parallel bus;
   a transmit buffer for providing an interface for the transmit shift register to the internal parallel bus;
   means for defining a functional state of the bus interface unit; and
   means for monitoring a plurality of logical signals characterizing the operational status of the bus interface unit, the monitoring means generating a plurality of control signals regulating a data transfer process between the biphase serial bus and the internal parallel bus.

14. The bus interface unit of claim 13 in which the means for defining a functional state is responsive to at least one of the control signals, whereby the functional state of the bus interface unit may be changed.

15. The bus interface unit of claim 13 in which the means for defining a functional state generates a plurality of state variable signals.

16. The bus interface unit of claim 15 in which the monitoring means further monitors the state variable signals.

17. The bus interface unit of claim 16 in which the means for defining a functional state is responsive to at least one of the control signals, whereby the functional state of the bus interface unit may be changed.

18. The bus interface unit of claim 17 in which another one of the control signals controls data flow from the receive buffer to the internal parallel bus.

19. The bus interface unit of claim 18 in which still another one of the control signals controls data flow from the internal parallel bus to the transmit buffer.

20. The bus interface unit of claim 19 in which still another one of the control signals controls data flow from the transmit shift register through the Manchester encoder/decoder to the biphase serial bus.

21. The bus interface unit of claim 13 which further comprises a bidirectional buffer through which the internal parallel bus communicates with a parallel direct memory access data port.

22. The bus interface unit of claim 21 in which the means for defining a functional state generates a plurality of state variable signals.

23. The bus interface unit of claim 22 in which the monitoring means further monitors the state variable signals.

24. The bus interface unit of claim 23 in which the means for defining a functional state is responsive to at least one of the control signals, whereby the functional state of the bus interface unit may be changed.

25. The bus interface unit of claim 24 in which another one of the control signals controls data flow from the receive buffer to the internal parallel bus.

26. The bus interface unit of claim 25 in which still another one of the control signals controls data flow from the internal parallel bus to the transmit buffer.

27. The bus interface unit of claim 26 in which still another one of the control signals controls data flow from the transmit shift register through the Manchester encoder/decoder to the biphase serial bus.

28. The bus interface unit of claim 27 in which still another one of the control signals controls a direction of data flow through the bidirectional buffer.

29. The bus interface unit of claim 28 in which still another one of the control signals controls data flow through the bidirectional buffer.

30. The bus interface unit of claim 29 which comprises at least one additional register responsive to the internal parallel bus.

31. The bus interface unit of claim 30 in which still another one of the control signals controls data flow from the internal parallel bus to the additional register.

32. The bus interface unit of claim 30 in which at least one of the logical signals is derived from the additional register.

33. A bus interface unit comprising:
   decoding means having a biphase serial input port for receiving an incoming data stream in transition code format, means for converting the format of the incoming data stream from transition code to logic level, and an NRZ output through which the incoming data stream is output in logic level format;
   means for deriving a word reception signal indicating when the incoming data stream is active;
   means for deriving a word identification signal indicating when the incoming data stream contains a command sync;
   encoding means having an NRZ input through which an outgoing data stream is input in logic level format, means for converting the format of the outgoing data stream from logic level to transition code, a biphase serial output port for transmitting the outgoing data stream in transition code format, a transmit enable input for controlling the outgoing data stream, and a sync select input for controlling a sync in the outgoing data stream;
   means for deriving a word transmission signal indicating when the outgoing data stream is active;
   means for deriving a bit count error signal indicating whether a defined segment of the incoming data stream includes a proper number of bits;
   means for deriving a Manchester error signal indicating whether the defined segment of the incoming data stream includes any Manchester errors;
   means for deriving a parity error signal indicating whether the defined segment of the incoming data stream has a proper parity;
   a receive shift register having a serial receive input and a receive output, the serial receive input being connected to the NRZ output;
   means for deriving a contiguous word signal indicating the presence of a contiguous word in the receive shift register;
   a transmit shift register having a transmit input and a serial transmit output, the serial transmit output being connected to the NRZ input;
   a parallel bus;

a parallel data port;

a bidirectional buffer connecting the parallel bus and the parallel data port, said bidirectional buffer having an enable buffer input for controlling data flow therethrough and a buffer direction input for controlling a direction of data flow between the parallel bus and the parallel data port;

a receive buffer having a receive buffer input responsive to the receive output, a receive buffer output connected to the parallel bus, a load receive buffer input responsive to the word reception signal for controlling data flow through the receive buffer input, and an enable receive buffer input for controlling data flow through the receive buffer output; a transmit buffer having a transmit buffer input responsive to the parallel bus, a transmit buffer output connected to the transmit input, and a load transmit buffer input for controlling data flow through the transmit buffer input;

a status word register having a status address field responsive to an address field of the parallel bus, a status address enable input for controlling data flow from the status address field to the address field, and a status word field including a broadcast command bit, an error indicator bit, and a status error field having an unbuffered field responsive to the parallel bus and a buffered field responsive to a status buffer register, the status buffer register being responsive to the parallel bus, the unbuffered field including a dynamic bus control bit, the buffered field including a terminal flag bit, said status word register further including a status enable input for controlling data flow from the status word field to the parallel bus, a status load input for controlling data flow into the broadcast command and error indicator bits and from the status buffer register to the buffered field, and an address load input for controlling data flow from the parallel bus to the status address field, the unbuffered field and the status buffer register;

a command word register having a command word input responsive to the parallel bus, a command word output connected to the parallel bus, a load command word input for controlling data flow through the command word input, and an enable command word input for controlling data flow through the command word output;

a last command word register responsive to the command word register, and having a last command output connected to the parallel bus, an enable last command input for controlling data flow through the last command output, and a load last command input for controlling data flow from the command word register to the last command word register;

a mode code logic unit responsive to a mode code field and transmit/receive bit in the command word register and outputting a transmit last command mode signal, a dynamic bus control mode signal, a terminal flag inhibit mode signal, an override inhibit mode signal and a transmit status mode signal;

a mode code detector responsive to a subaddress field in the command word register and outputting a mode code detect signal;

an address compare logic unit responsive to an operating mode signal, the status address field, and corresponding address fields in the receive shift register, the receive buffer, and the command word register, said address compare logic unit outputting an address compare signal, a broadcast detect signal, and a command broadcast detect signal, the address compare signal indicating whether the address field of the receive buffer matches either a broadcast bit pattern or the status address field when the bus interface unit is operating in a remote terminal mode and whether the address field of the receive shift and command registers match when the bus interface unit is operating in a bus controller mode, the broadcast detect signal indicating whether the address field in the receive buffer matches the broadcast bit pattern when the bus interface unit is operating in the remote terminal mode and whether the address field in the command register matches the broadcast bit pattern when the bus interface unit is operating in the bus controller mode, and the command broadcast detect signal indicating whether the address field in the command register matches the broadcast bit pattern;

a counter response timer having a stop count input responsive to the word reception signal and a start count input and outputting a response time error signal;

an error register having seven error bits, an error enable input for controlling data flow from the error bits to an error field of the parallel bus, and a clear error input for clearing the error bits the first through fourth error bits respectively being responsive to the response time error signal, the bit count error signal, the Manchester error signal and the parity error signal, the error register outputting an error indicator signal indicating whether any of the error bits are set, the error indicator bit of the status word register being responsive to the error indicator signal;

a control register having first, second and third control bits responsive to the parallel bus and a load control code input for controlling data flow from the parallel bus to the control register;

a word counter responsive to the mode code field in the command word register and the mode code detect signal and having a load word count input for controlling data flow from the command word register to the word counter and a decrement input for decrementing a word count stored in the word counter, the word counter outputting a word count zero signal indicating when the word count is equal to zero;

a flag register having first through fifth flag bits, the first flag bit being responsive to the broadcast detect signal, the broadcast command bit of the status word register being responsive to the first flag bit, the fifth flag bit being responsive to the mode code detect signal, the flag register further having a clear command flag input for clearing the second flag bit, a clear toggle flag input for clearing the third flag bit, a load flag input for controlling the setting of the first and fifth flags, and a flag clear input for clearing the first, second, third and fifth flags;

a sequence logic unit having a logical AND array responsive to a command strobe signal, the operating mode signal, a bus grant acknowledge signal, a logical combination of the transmit last command mode and the mode code detect signals, a data transfer acknowledge signal, the word reception signal, the word identification signal, the address compare signal, the error indicator signal, the first, second and third flag bits, a logical combination of a designated bit in the mode code field and the transmit/receive bit in the command word register and the mode code detect, dynamic bus control mode, transmit status mode, operating mode, and command broadcast detect signals, the word count zero signal, the word transmission signal, the contiguous word signal, and the first, second and third bits of the control register, the logical AND array outputting a plurality of logical product terms, the sequence logic unit further including a logical OR array responsive to the logical product terms and outputting a plurality of logical sum terms, the logical AND array further being responsive to a portion of the logical terms, the remaining sum terms defining an invalid message signal indicating the detection of errors in the incoming data stream, a write enable signal indicating a stable condition in the bidirectional buffer, a command strobe acknowledge signal indicating availability of the bus interface unit in response to the command strobe signal, a load timer signal, a data transfer request signal indicating availability of the parallel bus for data transfer from the parallel data port, a read/write signal indicating the direction of data flow between the parallel bus and the parallel data port, a command/data signal indicating a type of data flowing through the bidirectional buffer when the read/write signal indicates that data is flowing from the parallel bus to the parallel data port and otherwise indicating the completion of a data transfer from the parallel data port to the parallel bus, a message complete signal indicating when the outgoing data stream becomes inactive, a valid command signal indicating the reception of a valid command in the incoming data stream, a clear error/flag signal, an improper sync signal, an address mismatch signal, an improper word count signal, a load remote terminal address signal, an enable data signal, a load command signal, a load word counter signal, an enable command signal, an enable buffer signal, a strobe mode code signal, a status word load signal, a load transmit buffer signal, a shift word count signal, a transmit enable signal, a sync select signal, an enable status word signal, an enable last command signal, a load control word signal and a set toggle signal, the clear command flag input being responsive to a logical combination of the invalid message and message complete signals, the start count input of the counter response timer being responsive to the load timer signal, the buffer direction input being responsive to the read/write signal, the clear error and flag clear inputs being responsive to the clear error/flag signal, the fifth, sixth and seventh error bits respectively being responsive to the improper sync signal, the address mismatch signal, and the improper word count signal, the address load input of the status word register and the fourth flag bit of the flag register being responsive to the load terminal address signal, the enable receive buffer input being responsive to the enable data signal, the load command word and load last command inputs being responsive to the load command signal, the load word count and load flag inputs and the second flag bit being responsive to the load word counter signal, the enable command word input being responsive to the enable command signal, the enable buffer input being responsive to the enable buffer signal, the clear toggle flag and error enable inputs being responsive to the strobe mode code signal, the status load input being responsive to a logical combination of the transmit/receive bit in the command word register and the transmit last command mode, transmit status mode, mode code detect and status word load signals, the load transmit buffer input being responsive to the load transmit buffer signals, the load transmit buffer input being responsive to the load transmit buffer signal, the decrement input being responsive to the shift word count signal, the transmit enable and sync select inputs of the encoding means, respectively, being responsive to the transmit enable and sync select signals, the status enable input being responsive to the enable status word signal, the status address enable input being responsive to a logical combination of the enable status word and strobe mode code signals, the enable last command input being responsive to the enable last command signal, the load control code input being responsive to the load control word signal, and the third flag bit being responsive to a logical combination of the operating mode, load word counter and set toggle signals;

means for masking the dynamic bus control bit having a set dynamic bus mask input responsive to a logical combination of the fifth flag bit, the transmit/receive bit and the strobe mode code signal, and a clear dynamic bus mask input responsive to a logical combination of the transmit/receive bit, the mode code detect signal and the dynamic bus control mode signal;

means for masking the terminal flag bit having a set terminal flag mask input responsive to a logical combination of the terminal flag inhibit mode and strobe mode code signals and a clear terminal flag mask input responsive to a logical combination of the override inhibit mode and strobe mode code signals and the fifth flag bit;

means responsive to the transmit/receive and second flag bits, the mode code detect and message complete signals, and the transmit last command and transmit status mode signals for clearing all of the status error field except the dynamic bus control bit; and means responsive to a power on reset signal for clearing the error and flag registers and the counter response timer.

* * * * *